United States Patent Office 2,956,339
Patented Oct. 18, 1960

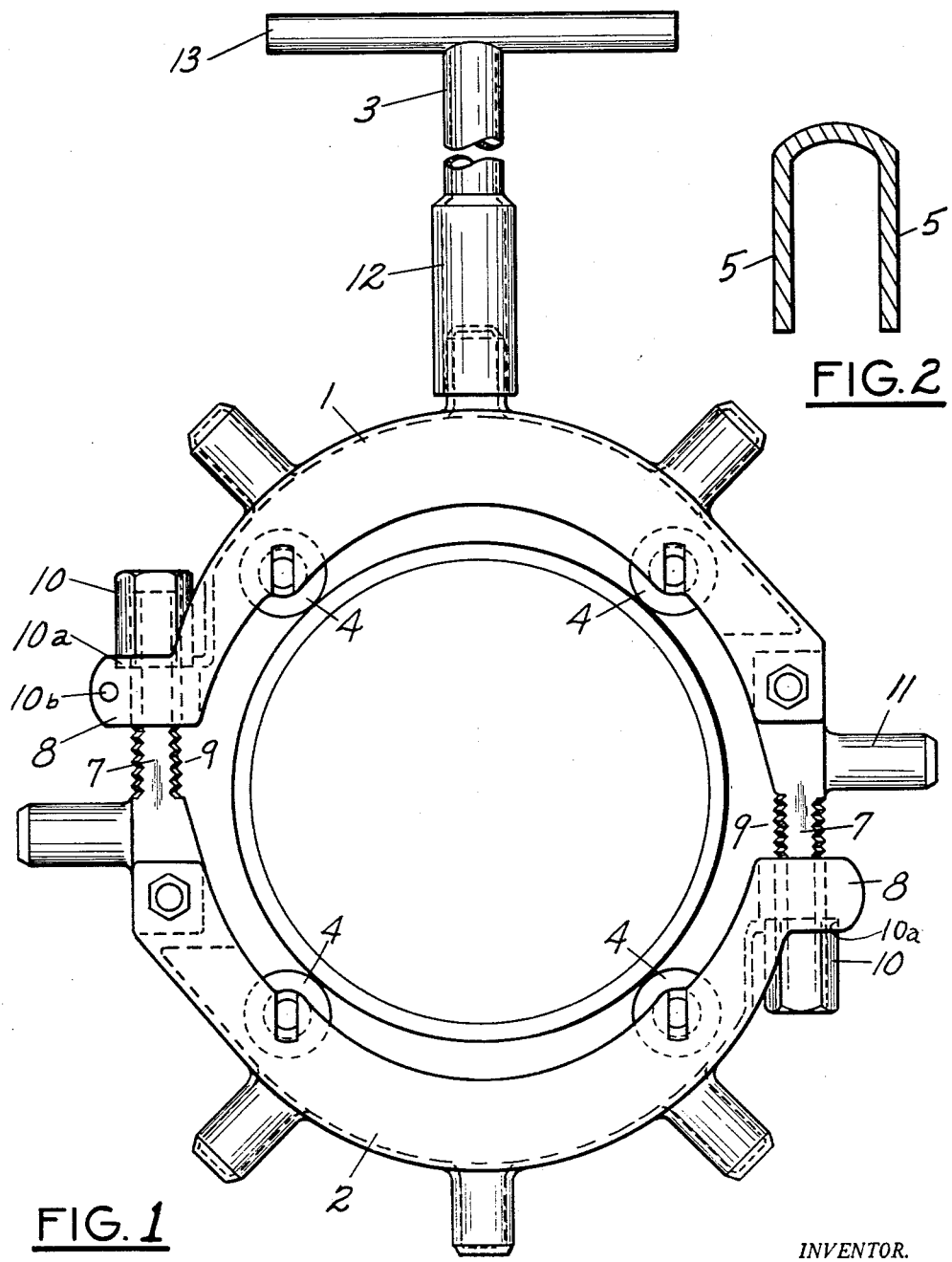

2,956,339
PIPE CUTTER

Axel V. Jonasson, Erie, Pa., assignor to Reed Manufacturing Company, Erie, Pa., a corporation of Pennsylvania Filed May 14, 1959, Ser. No. 813,257

3 Claims. (Cl. 30—101)

Pipe cutters for large size pipe (e.g. 16"–36") such as used for water mains if of conventional design are heavy and bulky and difficult to set up, all of which are objectionable features, particularly when the pipe is to be cut in a cramped space such as at the bottom of a trench. This invention is a pipe cutter for large size pipe which one man can frequently set up and complete a cut in less time than two men can get a conventional pipe cutter in position to start the cut.

In the drawing, Fig. 1 is an end view of the pipe cutter in position to cut a pipe, and Fig. 2 is a section on line 2—2 of Fig. 1.

The pipe cutter comprises three main parts, two C-shaped sections 1 and 2, and a T-wrench 3. Each of the C-sections is of channel cross section, as shown in Fig. 2, and carries two cutting wheels 4 suitably journaled between its side walls or flanges 5. At one end, each of the C-sections 1, 2 has pivoted thereto a link 6, the opposite end 7 of which is slidably received in a slot between ears 8 on the other of the C-shaped members 1. The width of the end 7 of each of the links 6 is greater than its thickness and it is provided on opposite edges with threads 9 on which may be screwed a nut 10. When the cutter is to be set up in position to make a cut on a pipe, one of the nuts 10 is loosened until it is clear of the counterbore 10a and the associated link is swung out of its slot permitting the associated ends of the C-shaped members 1 to swing apart sufficiently to receive the pipe. Replacing the link and tightening the nut brings the C-shaped members together in end-to-end relation about the pipe and forces the cutting wheels 4 into contact with the pipe. Because the C-shaped sections 1 are relatively light, it is easy for one man to set the cutter up on even a very large diameter pipe.

Only one of the nuts 10 is used for setting up the cutter. The link associated with the other nut is held in place by a pin 10b.

After the cutter is in place, it is rotated about the pipe to make a cut by means of the T-wrench 3 which acts both as a lever and as a wrench for tightening the nuts 10. For this purpose, there are arranged on each of the C-shaped members 1 a plurality of projections 11, any one of which may be engaged by the wrench socket 12 of the T-wrench. In the particular cutter shown, there are three projections 11 on each of the C-members 1, 2 and one projection 11 on each of the links 6 pivoted to the C-members. This provides a total of eight equally spaced projections 11 which may be used to turn the cutter about the pipe. At each half revolution of the cutter, one of the nuts 10 comes into position where it can be tightened to force the cutting wheels 4 into the cut. The tightening of the nuts is easily effected by the same wrench used as a lever for turning the cutter. The T-wrench can have a stem of length suitable for providing the leverage for turning the cutter and a handle 13 of length suitable for tightening the nuts. The large number of projections 11 makes possible that each stroke of the lever be relatively short even with a wrench having a long stem. While it is contemplated that the T-wrench will be used on each of the projections 11 successively in order to cut down the length of the turning stroke, that is a matter which is controlled by the preference of the user.

The cutter is particularly useful for cutting pipe in trenches. The space between the pipe and the sides and bottom of the trench need only be enough to clear the projections 11.

What is claimed as new is:

1. A pipe cutter comprising two opposed C-sections adapted to encircle a pipe in end to end relation, a plurality of cutting wheels supported on and projecting radially within the inner surface of said sections, means pivoting adjacent ends of the sections together, at least one of the pivoting means including a nut projecting radially outside said sections, a plurality of projections on said C-sections, and a wrench having a socket alternatively receiving said nut or any one of said projections, said wrench having a handle extending radially from the axis of the socket for turning the nut when the socket is disposed on the nut and a stem coaxial with the socket and crosswise of the handle serving as a lever for turning the cutter when the socket is disposed on one of said projections.

2. A pipe cutter comprising two opposed C-sections adapted to encircle a pipe in end to end relation, a plurality of cutting wheels supported on and projecting radially within the inner surface of said sections, each section having a tangentially extending link pivoted to one end thereof and each section having its other end slidably receiving a portion of the link pivoted to the other section, nuts on the slidable portions of the links for moving the sections toward each other to force the wheels against the pipe for cutting, a plurality of projections on said C-sections, and a wrench having in one end a socket alternatively receiving any one of said nuts or any one of said projections, said wrench having a handle extending radially from the axis of the socket for turning the nut when the socket is disposed on one of said nuts and a stem coaxial with the socket and crosswise of the handle serving as a lever for turning the cutter when the socket is disposed on one of said projections.

3. A pipe cutter comprising two opposed C-sections adapted to encircle a pipe in end to end relation, a plurality of cutting wheels supported on and projecting radially within the inner surface of said sections, means pivoting adjacent ends of the sections together, at least one of the pivoting means including screw threaded means for forcing the adjacent ends of the sections together, said screw threaded means being accessible from radially outside said sections, a plurality of angularly spaced connectors on said C-sections and likewise accessible from radially outside said sections, a lever having at one end a handle radially outside said sections and having at the other end provisions for alternatively engaging said screw threaded means or any one of said connectors, said lever when engaged with said screw threaded means being rotatable on its longitudinal axis to apply a turning torque to said screw threaded means and having an arm fixed crosswise to the lever for applying said torque to the lever, and said lever when engaged with any of said connectors being in fixed relation to said sections for applying a torque turning the cutter about the pipe.

References Cited in the file of this patent

UNITED STATES PATENTS

| 691,649 | Mitchell | Jan. 21, 1902 |
| 1,168,344 | Spencer | Jan. 18, 1916 |
| 2,184,114 | Carlsen | Dec. 19, 1939 |